OPTICAL DATA PROCESSING SYSTEM

Filed Oct. 18, 1963 2 Sheets-Sheet 1

INVENTOR.
JOSEPH K. HAWKINS
CLARENCE J. MUNSEY
BY Robert D. Sanborn
John A. Duffy
ATTORNEYS INVENTOR.
JOSEPH K. HAWKINS
CLARENCE J. MUNSEY
BY Robert D. Sanborn
John A. Duffy
ATTORNEYS United States Patent Office 3,506,806

Patented Apr. 14, 1970

3,506,806

OPTICAL DATA PROCESSING SYSTEM

Joseph K. Hawkins, Newport Beach, and Clarence J. Munsey, Costa Mesa, Calif., assignors, by mesne assignments, to Philco-Ford Corporation, a corporation of Delaware Filed Oct. 18, 1963, Ser. No. 317,372
Int. Cl. G06k 7/00
U.S. Cl. 235—61.6 7 Claims

ABSTRACT OF THE DISCLOSURE

Optical data processing system using binary display matrix and associated receiving matrix having light sensitive points, each arranged to receive light from several bit locations on display matrix.

This invention relates to digital data processing systems and more particularly to a data processing system for the parallel processing of large quantities of digital data by optical techniques.

The recent advent of more sophisticated pattern recognition and correlation devices has created a need for systems for processing image data. Since image data often appears as a large number of bits of information in parallel form, a need exists for a data processing system capable of handling such data. Additionally, such a data processing system preferably should be capable of handling the data in substantially the same form as it is encountered on the image.

A general purpose computer of conventional organizational is capable in principle and can be designed to process data in parallel form. However, since extremely large numbers of bits of information must be processed, conventional digital computers are slow and inefficient when handling large amounts of data and therefore are not capable of practically processing image data. Utilizing a parallel conventional digital computer does not solve the problem since this type of computer requires a large amount of circuitry and logical programming to process the data in its proper perspective and provide the desired result.

Accordingly, it is an object of this invention to provide an efficient image data processing system.

The digital data processing system of this invention achieves a high degree of efficiency and performance by processing image data in its natural form by optical techniques. A simple but highly reliable parallel logic processing unit is provided which is completely compatible with the high resolution data present in image form without incurring the reliability and cost penalties generally associated with the usually large numbers of relatively complex electronic circuits which are required to handle image data. A simple optical system is provided which performs logic operations in parallel upon entire frames of image data. A system memory stores intermediate results as complete frames of image data, thereby maintaining the spatial relationship and resolution required in the processing of two dimensional image data. Complete logic operations including computations, processing, and storage are performed in a highly efficient and reliable manner.

It is therefore another object of this invention to provide a digital data processing system for handling data in image form.

It is another object of this invention to provide a data processing system for handling image data by optical techniques.

It is a further object of this invention to provide an optical digital data processing system for performing digital computations on image data.

Other objects of invention will become apparent from a reading of the following specification.

DRAWINGS

SUMMARY

According to a principal aspect of the invention, a light emissive two dimensional matrix display field has information signals representative of digital data recorded thereon in binary form. An optical path system is provided for projecting the display field on a light sensitive two dimensional field, an optical mask is disposed within the optical path for forming an image of the display field onto the light sensitive field. The optical mask is arranged to correspond to selected areas on the display field which are to be processed so that light from each selected area on the display is imaged on a corresponding point on the light sensitive field. The information imaged on the light sensitive field is operated upon to produce logic functions of the information on the display field. Inherent in or associated with the light sensitive field is a memory or storage means, whereby the values of the logic functions produced can be stored. Means are provided to transfer the contents of the memory to the light sensitive display field at a subsequent time when, with the same or a new optical mask disposed in the optical path, a subsequent logic operation can be performed.

FIG. 1

Figures 1, 2, 3:
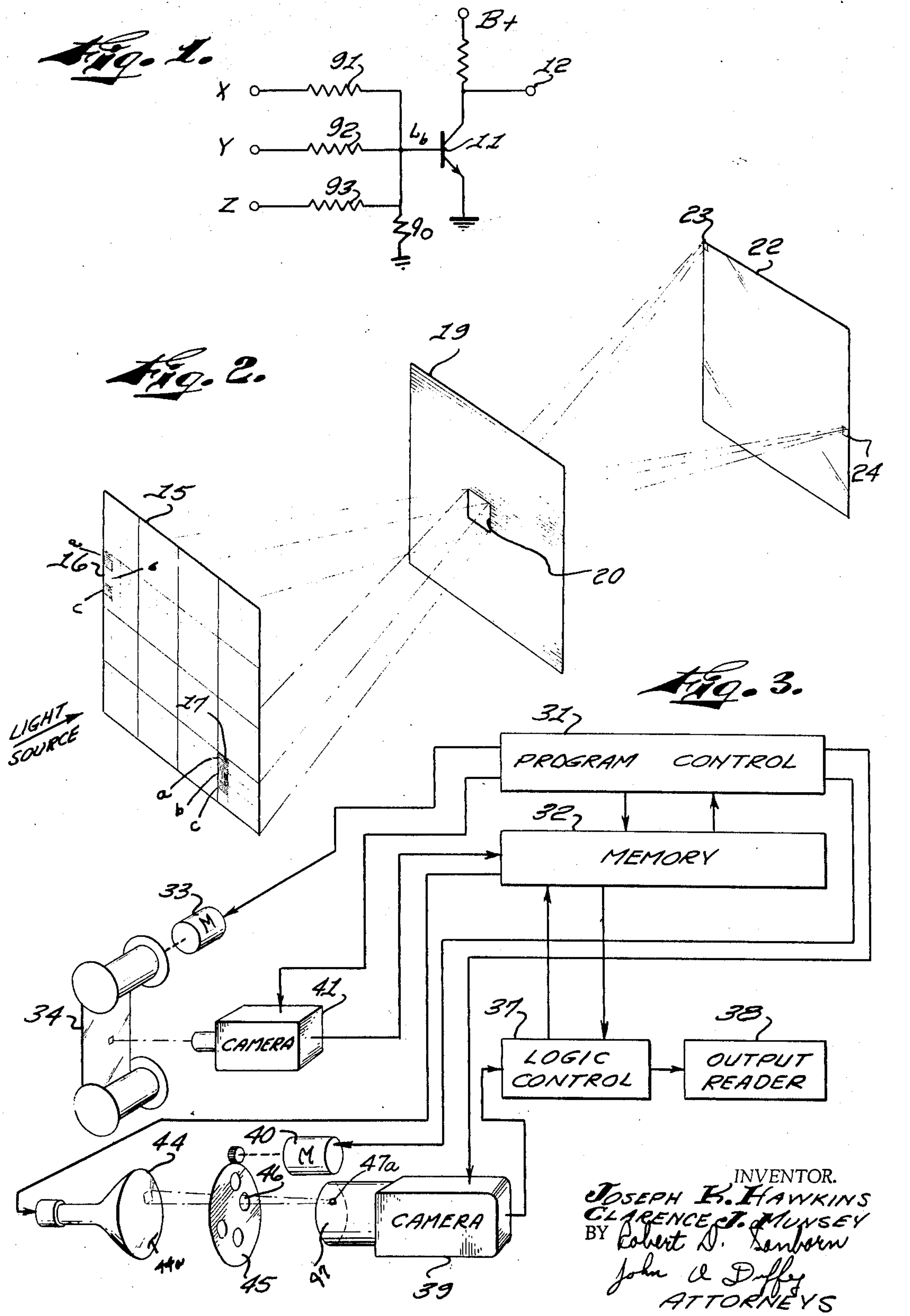
FIG. 1 is a representation of a simple electrical logic circuit which is known in the digital computer art.
FIG. 2 is a diagrammatic representation of the optical portion of the system.
FIG. 3 is a schematic diagram of a digital data processing system according to the invention.

FIG. 1 shows a simple electrical circuit for performing a logic operation according to the equation:

$$F = X'Y'Z'$$

This equation represents a logic AND function. The resistors $g_1$, $g_2$, and $g_3$ receive binary input signals X, Y, and Z, and in conjunction with resistor $g_0$, provide a voltage addition function, presenting the sum to the base of the transistor 11. The threshold conduction point of transistor 11 is such that transistor 11 will conduct and the output potential at terminal 12 will go from a positive value to near ground when binary ONE signals are present at all of the terminals X, Y, and Z. The resistors are selected of a proper conductance to mechanize the AND logic function.

FIG. 2

FIG. 2 shows in diagrammatic form an optical path system for performing logic operations on image data. A light emissive two dimensional display field 15 includes areas 16 and 17 which have information signals recorded thereon. In area 16, section **16*a* is a spot of light representing a binary ONE for the input variable X; section 16*b* has no spot of light recorded, thereby representing a ZERO for the variable Y and section 16*c* is a spot of light representing a ONE for the input variable Z. Similarly, in the area 17, sections 17*a*, 17*b*, and 17*c*** are spots of light representing a ONE for each of these three variables.

The light spots on display field 15 are imaged on a light sensitive field 22 by way of an optical mask 19 which has an aperture 20 for imaging the light spots to points 23 and 24. The aperture 20 has a transmittance corresponding to the conductances $g_1$, $g_2$, and $g_3$ of the resistors in the logic circuit of FIG. 1. The size and location of the aperture 20 is selected to correspond to the desired logic operation to be performed on the data recorded on the field 15. The light spots at 16*a* and 16*c* on area 16 represent so-called true conditions of input variables X and Z and the lack of a light spot at 16*b* represents that the input variable Y is in a so-called false condition. This results in an insufficient amount of light energy reaching the point 24 on the plane 22 to indicate a true condition output for the logic AND function.

Since area 17 has light spots at 17*a*, 17*b*, and 17*c*, sufficient light energy will reach point 23 to indicate a true condition for the AND function.

Thus, it can be seen from the diagrammatic view of the light path system in FIG. 2 that logic operations may be performed on digital data recorded on the light emissive field 15 by imaging light from selected areas through an aperture in the mask 19 on the light sensitive field 22. A quantity of light energy is imaged simultaneously from every area on field 15 containing input variables. All the logic operations are performed simultaneously and in parallel without any electrical or mechanical interconnections. The resulting values of the logic functions performed may be stored by using a light sensitive recording medium for field 22, or they may be transferred to a separate memory device to await subsequent logic processing.

FIG. 3 shows one embodiment of the invention in which input data is supplied in its natural state on a conventional reel film 34. A desired section of film 34 is viewed by a camera 41, with both the film 34 and the camera 41 being controlled by a program control 31 which presents signals to a motor 33 for advancing the film as well as positioning the camera's field of view. Camera 41 may comprise a vidicon television camera of known type which scans the desired section of film 34 to produce video data and which then converts the data to sequential binary digits e.g., by using timing signals from program control 31 to produce a digital data pulse train of ONES and ZEROS representing the image data on the film 34.

The digital data output of the camera 41 is supplied to a memory 32 which may comprise a conventional magnetic drum which stores the digital data bits. At a desired time the program control 31 causes memory 32 to supply the stored data to a conventional cathode ray display tube 44. Tube 44 displays the data received from memory 32 on a light emissive surface 44*a* which corresponds to light emissive plane 15 of FIG. 2. A circular opaque mask 45 is disposed between the light emissive surface 44*a* and a light sensitive surface 47 of a camera 39; mask 45 includes a plurality of apertures 46 corresponding to logic functions to be performed. The mask 45 may be in the form of a disk whose position is controlled through a motor 40 by the program control 31 so that light from surface 44*a* is imaged through a selected aperture 46 to the surface 47 of camera 39. Camera 39 may be an image orthicon camera whose light sensitive surface 47 is arranged to store charges at a plurality of points thereon in response to light received from the light emissive surface 44*a*. Conventional means are provided in the camera 39 for scanning off the pattern of charges from surface 47 and supplying a corresponding electrical signal to a logic control 37. The logic control 37 has amplitude decision circuits and other logic circuits well known in the digital computer art for completing the formation of the logic operation and providing an output to a reader 38 as well as storing the output in memory 32.

A typical operation of the device of FIG. 3 in performing the logic AND function will now be described. Data initially contained on film 34 is processed by camera 41 and stored in form of bits of binary information in the memory 32. Memory 32 transfers the bits of information to input of the display tube 44 which displays the information in the form of light spots on surface 44*a*. Thus, for example, input variables corresponding to the X, Y, Z variables of the circuit of FIG. 1 may be presented as light spots on a selected area of the light emissive surface 44*a*. This area is imaged through the selected aperture 46 to the point 47*a* on light sensitive surface 47 of camera 39. If all of the variables X, Y, and Z are present in the form of light spots on the imaged area of surface 44*a*, the sum of the light reaching point 47*a* will be sufficient to charge point 47*a* beyond a given value. Thus when this charge is scanned off, a resultant pulse signal will be produced which will be sufficient to meet the threshold decision function requirement of the logic control 37 which receives the electrical signal from camera 39. Thus, the logic control 37 will present an electrical signal output to the output reader 38 and the memory 32 which will indicate fulfillment of the logic function. In this manner, logic operations have been performed by optical means.

Figure 4:
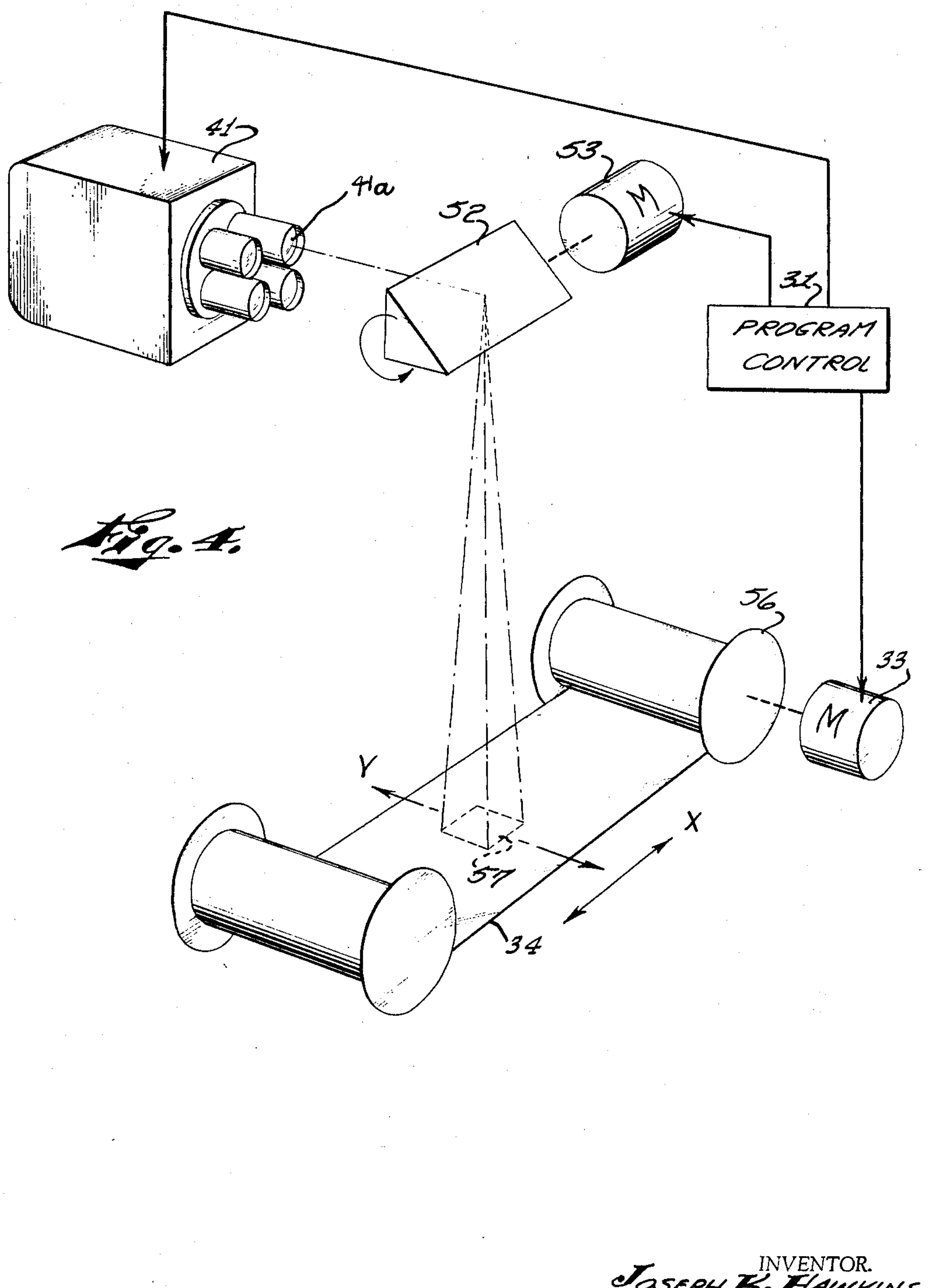
FIG. 4 is a schematic diagram illustrating specific features of the input portions of the system of FIG. 3.

FIG. 4 shows in detail a preferred means for transferring the information from film 34 to camera 41. A movable prism 52, which is controlled by a motor 53 in response to a control signal from the program control 31, is utilized to position the field of view of the camera 41 on a selected area 57 so that a selected lens 41*a* of the desired magnification can view area 57 through prism 52. Prism 52 and the film can be positioned so that any desired area on the film may be viewed by the camera 41.

The device of this invention is particularly advantageous in solving problems such as pattern recognition wherein a tremendous amount of input data in the form of stored images may be processed. Image data stored on plane 15 of FIG. 2, for example, may be simultaneously processed by the optical path system so that logic operations can be performed on all of the data on the surface of the plane 15 simultaneously and in parallel. The spatial relation of the data is preserved by the optical path system.

Although exemplary embodiments of the invention have been disclosed and discussed, it will be understood that other applications of the invention are possible and the embodiments disclosed may be subject to various changes, modifications, and substitutions without necessarily departing from the spirit of the invention.

What we claim is:

1. An image data processing system comprising:

a light emissive two dimensional display field having a given number of sections, each section containing a plurality of selectively illuminable areas for representing information in binary form, a two dimensional receiving field having said given number of light sensitive regions thereon, and means for imaging said display field onto said receiving field such that the light energy received by each of said regions represents the sum of the light energy from said plurality of areas of a respective one of said sections of said display field, and the light from each of said sections is imaged onto an exclusive one of said regions.

2. The data processing system of claim 1 wherein said light sensitive field comprises the light sensitive surface of a television scanning camera.

3. The data processing system of claim 1 wherein said display field comprises a cathode ray tube having a luminescent surface.

4. An image data processing system comprising:

a light emissive two dimensional display field having a plurality of selectively illuminable areas for representing information in binary form, a two dimensional receiving field having a plurality of light sensitive regions thereon, means for imaging said display field onto said receiving field such that the light energy received by one of said regions represents the sum of the light energy from a plurality of said areas of said display field,
means for scanning an image to produce a signal representative of said image,
means for quantizing said signal in binary form, and
means for selectively illuminating said areas of said display field in accordance with the resultant binary-quantized signal.

5. The data processing system of claim 4 further including means for storing said quantized signal prior to illuminating said display field.

6. An image data processing system, comprising:
a cathode ray tube display unit arranged to display information in the form of a plurality of illuminated spots on the surface of said tube,
an image receiving unit comprising a television scanning camera having a surface containing a plurality of light-sensitive points,
means for imaging light from said display unit to said receiving unit such that at least one of said points on said surface of said camera receives light from a plurality of spots from said display unit, and
logic threshold means connected to said camera for providing a predetermined signal if the light imaged on said one of said points exceeds a predetermined value.

7. The data processing system of claim 6 further including means for scanning an image to provide a scan signal representative of said image, means for quantizing said signal in binary form, and means for illuminating spots on said display unit in accordance with the resultant binary-quantized signal.

References Cited

UNITED STATES PATENTS

| | | | |
|---|---|---|---|
| 3,085,231 | 5/1963 | Linder. | |
| 3,145,368 | 8/1964 | Hoover. | |
| 3,305,669 | 2/1967 | Fan. | |
| 3,191,157 | 6/1965 | Parker et al. | 250—219 |

DARYL W. COOK, Primary Examiner

U.S. Cl. X.R.

340—173